(12) United States Patent
Tanaka et al.

(10) Patent No.: US 9,991,556 B2
(45) Date of Patent: *Jun. 5, 2018

(54) GARNET-TYPE LI-ION CONDUCTIVE OXIDE

(71) Applicant: TDK CORPORATION, Tokyo (JP)

(72) Inventors: Teiichi Tanaka, Tokyo (JP); Takeo Tsukada, Tokyo (JP); Taisuke Masuko, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/063,906

(22) Filed: Mar. 8, 2016

(65) Prior Publication Data

US 2016/0268629 A1    Sep. 15, 2016

(30) Foreign Application Priority Data

Mar. 10, 2015 (JP) ................................ 2015-047172
Feb. 3, 2016 (JP) ................................ 2016-018897

(51) Int. Cl.
*H01M 10/0562* (2010.01)
*H01M 10/0585* (2010.01)
*H01M 10/052* (2010.01)

(52) U.S. Cl.
CPC ..... *H01M 10/0562* (2013.01); *H01M 10/052* (2013.01); *H01M 10/0585* (2013.01); *H01M 2300/0077* (2013.01)

(58) Field of Classification Search
CPC ........... H01M 10/0562; H01M 10/052; H01M 10/0585; H01M 2300/0077
See application file for complete search history.

(56) References Cited

U.S. PATENT DOCUMENTS

| 2015/0099190 A1* | 4/2015 | Holme | H01M 10/0525 |
| | | | 429/322 |
| 2016/0111751 A1* | 4/2016 | Badding | C01G 25/006 |
| | | | 429/322 |
| 2016/0190639 A1* | 6/2016 | Sung | H01M 10/0562 |
| | | | 429/319 |

(Continued)

FOREIGN PATENT DOCUMENTS

| CN | 103117413 A | 5/2013 |
| CN | 104124467 A | 10/2014 |

OTHER PUBLICATIONS

Ramaswamy Murugan et al; "Fast Lithium Ion Conduction in Garnet-Type Li7La3Zr2O12;" Agnew. Chem. Int. Ed.; 2007; vol. 46; pp. 7778-7781.

(Continued)

*Primary Examiner* — Stewart A Fraser
(74) *Attorney, Agent, or Firm* — Oliff PLC

(57) ABSTRACT

A garnet-type Li-ion conductive oxide contains Li, La, Zr, and oxygen and contains at least one type of element among elements represented by M1, M2, M3, and M4. M1, M2, M3, and M4 are as follows: M1: One or more types of elements selected from the group consisting of Mg, Ca, Sr, Ba, and Zn; M2: One or more types of elements selected from the group consisting of Al, Ga, Co, Fe, and Y; M3: One or more types of elements selected from the group consisting of Sn and Ge; and M4: One or more types of elements selected from the group consisting of Ta and Nb.

17 Claims, 1 Drawing Sheet

(56) References Cited

U.S. PATENT DOCUMENTS

2016/0268628 A1* 9/2016 Masuko ............ H01M 10/0562

OTHER PUBLICATIONS

Ramaswamy Murugan et al., "High conductive yttrium doped Li7La3Zr2O12 cubic lithium garnet," Electrochemistry Communications 13 (2011), pp. 1373-1375.
Alexander Kuhn et al., "Li Ion Dynamics in Al-Doped Garnet-Type Li7La3Zr2O12 Crystallizing with Cubic Symmetry," Z. Phys. Chem, 226 (2012), 525-537.

* cited by examiner

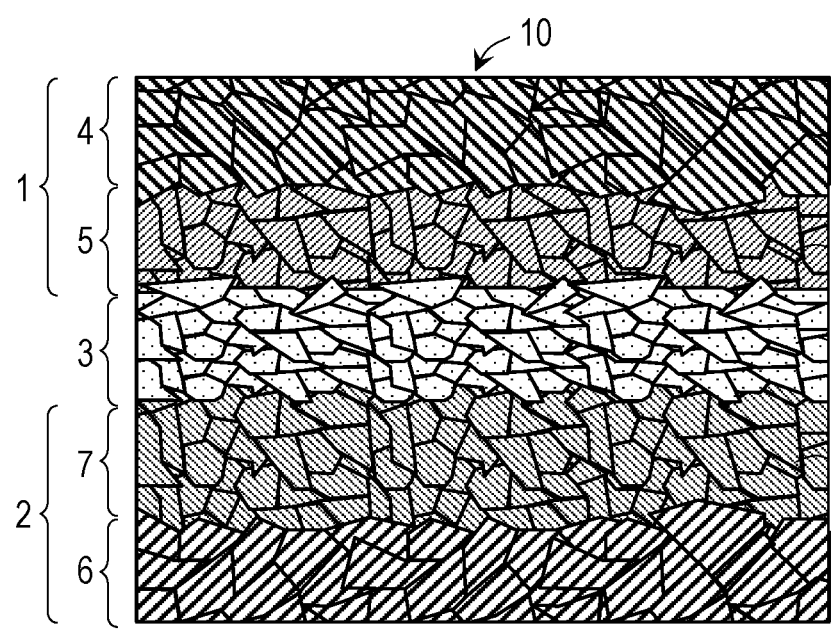

GARNET-TYPE LI-ION CONDUCTIVE OXIDE

CROSS-REFERENCE TO RELATED APPLICATION

This application claims priority from Japanese Patent Application No. 2015-047172 filed with the Japan Patent Office on Mar. 10, 2015, the entire content of which is hereby incorporated by reference.

The present disclosure relates to a garnet-type Li-ion conductive oxide.

BACKGROUND

The development of portable devices such as personal computers and portable telephones has led to increasing demands for secondary batteries as the source of their power supply. In the secondary batteries for such purposes, a liquid electrolyte, such as organic solvent, is being widely used as a medium for causing ion movement. In a battery using the liquid electrolyte, there is a possibility that the electrolyte may become thermally unstable.

From the viewpoint of ensuring fundamental safety, development is underway for, e.g., an all-solid secondary battery in which solid electrolyte is used instead of liquid electrolyte, and in which all the other battery elements are configured of solids. In the all-solid secondary battery, the electrolyte is sintered ceramics, for example. Accordingly, the all-solid secondary battery has high thermal stability. In addition, the all-solid secondary battery is not prone to the problem of battery performance degradation due to corrosion, for example. Among others, an all-solid lithium secondary battery having electrodes in which lithium metal is used is believed to provide a secondary battery with which high energy density can be easily achieved.

In order to enhance the battery characteristics of a secondary battery, it is important to increase the potential difference between the material used in the positive electrode and the material used in the negative electrode, and to increase the capacity density of the materials used in the positive and negative electrodes. Particularly, with respect to the negative electrode material, it is known that use of lithium metal or lithium alloys greatly contribute to characteristics enhancement. However, when lithium metal is used in the negative electrode, dendrite (whisker-like crystal) may become deposited on the negative electrode as a result of charging and discharging. In a worst case, the dendrite may penetrate the separator and cause the problem of short-circuit between the positive and negative electrodes. Accordingly, due to safety concerns, lithium metal has not been used in the negative electrode. In the all-solid battery, in which the electrolyte portion is formed of a solid, deposits will not penetrate the solid electrolyte, and therefore it is expected that lithium metal can be safely used. However, lithium metal has the lowest potential and high reactivity. Accordingly, it has been difficult to obtain ceramics solid electrolyte in which lithium metal can be applied.

In recent years, it has been reported that $Li_7La_3Zr_2O_{12}$ (hereafter referred to as LLZ), which is a garnet-type Li-ion conductive oxide, does not readily react with lithium metal or lithium alloys used in negative electrode and therefore provides a stable solid electrolyte, and that the LLZ may possibly be utilized as a solid electrolyte for all-solid Li secondary battery (Angew. Chem. Int. Ed., 2007, 46, 7778-7781).

SUMMARY

A garnet-type Li-ion conductive oxide contains Li, La, Zr, and oxygen and contains at least one type of element among elements represented by M1, M2, M3, and M4. M1, M2, M3, and M4 are as follows:

M1: One or more types of elements selected from the group consisting of Mg, Ca, Sr, Ba, and Zn;
M2: One or more types of elements selected from the group consisting of Al, Ga, Co, Fe, and Y;
M3: One or more types of elements selected from the group consisting of Sn and Ge; and
M4: One or more types of elements selected from the group consisting of Ta and Nb.

BRIEF DESCRIPTION OF THE DRAWING

The FIGURE is a cross sectional view illustrating a conceptual structure of an all-solid type lithium-ion secondary battery.

DETAILED DESCRIPTION OF THE EMBODIMENTS

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to Angew. Chem. Int. Ed., 2007, 46, 7778-7781, a method for fabricating LLZ sintered material includes, e.g., embedding a molding in a powder of the composition; maintaining a thermal process at 1230° C. for 36 hours; and setting the temperature increase rate at 1° C./min. Thus, the method is very cumbersome. In addition, because the thermal process is performed at 1000° C. or above, evaporation of Li tends to occur. As Li evaporates, $La_2Zr_2O_7$ and the like are generated, causing the sintered material to readily effloresce.

Further, if the thermal process temperature is increased or the temperature increase rate is increased so as to more simply fabricate the LLZ sintered material described in Angew. Chem. Int. Ed., 2007, 46, 7778-7781, ion conductivity is decreased.

An object of the present disclosure is to provide a highly ion-conductive garnet-type Li-ion conductive oxide having high sintered density by substituting the Li site of $Li_7La_3Zr_2O_{12}$ with another element.

In order to achieve the object, the present inventors conducted researches and have found that a highly ion-conductive garnet-type Li-ion conductive oxide having high sintered density can be obtained by substituting the Li site of $Li_7La_3Zr_2O_{12}$ with another element.

That is, a garnet-type Li-ion conductive oxide according to an aspect of the present disclosure contains Li, La, Zr, and oxygen and contains at least one type of element among elements represented by M1, M2, M3, and M4. M1, M2, M3, and M4 are as follows:

M1: One or more types of elements selected from the group consisting of Mg, Ca, Sr, Ba, and Zn;
M2: One or more types of elements selected from the group consisting of Al, Ga, Co, Fe, and Y;
M3: One or more types of elements selected from the group consisting of Sn and Ge; and M4: One or more types of elements selected from the group consisting of Ta and Nb.

According to the configuration, a highly ion-conductive garnet-type Li-ion conductive oxide having high sintered density can be obtained.

A garnet-type Li-ion conductive oxide according to the other aspects of the present disclosure is represented by composition formula $Li_{x-2a-3b-4c-5d}M1_aM2_bM3_cM4_dLa_3Zr_2O_{12}$. M1, M2, M3, and M4 in the composition formula and ranges of a, b, c, d, and x in the composition formula are as follows:

M1: One or more types of elements selected from the group consisting of Mg, Ca, Sr, Ba, and Zn;
M2: One or more types of elements selected from the group consisting of Al, Ga, Co, Fe, and Y;
M3: One or more types of elements selected from the group consisting of Sn and Ge;
M4: One or more types of elements selected from the group consisting of Ta and Nb;
$0 \leq a \leq 0.50$;
$0 \leq b \leq 0.33$;
$0 \leq c \leq 0.25$;
$0 \leq d \leq 0.20$;
$0 < 2a+3b+4c+5d \leq 1.0$; and
$6.0 \leq x \leq 8.0$.

According to the configuration, a highly ion-conductive garnet-type Li-ion conductive oxide having high sintered density can be obtained. The operation and effect are believed to be such that by substituting a pre-composed element of the garnet-type Li-ion conductive oxide with another element, sintering is promoted and high sintered density (relative density of 90% or more) can be stably obtained. The present inventors attribute the main cause of the promotion of sintering to the following. From the viewpoint of equilibrium, by reducing Li that easily evaporates, the remaining Li in the oxide is made difficult to evaporate and stabilized. Further, energy loss due to the heat of Li vaporization is suppressed. At the same time, the number of elements included in the composition formula is increased, whereby the types of raw material are increased. In this way, reaction processes are increased, and sintering is assisted by the reaction heat produced.

Furthermore, M1, M2, and M3 in the composition formula may be as follows:
M1: One or more types of elements selected from Ca, Sr, and Ba;
M2: One or more types of elements selected from the group consisting of Al, Ga, and Y; and
M3: Ge element.

In this way, the effect of an increase in ion conductivity can be obtained. The main cause of the effect is believed to be the following. Namely, by substituting Li in a LLZ tetragon with an element of a valence of 2 or more, the share of Li can be decreased. As a result, Li ions are made easier to move, whereby ion conductivity is increased.

The all-solid type lithium-ion secondary battery including the garnet-type Li-ion conductive oxide includes an ion conductive oxide having high ion conductivity, and therefore provides an excellent lithium-ion secondary battery.

According to the above aspects of the present disclosure, there is provided a garnet-type Li-ion conductive oxide in which the Li site of $Li_7La_3Zr_2O_{12}$ is substituted with another element, resulting in high sintered density and ion conductivity of the oxide. Further, by including the garnet-type Li-ion conductive oxide in an all-solid type lithium-ion secondary battery, an all-solid type lithium-ion secondary battery having excellent characteristics can be provided.

In the following, a preferred embodiment of the present disclosure will be described with reference to the drawings. The all-solid type lithium-ion secondary battery according to the present disclosure is not limited to the following embodiment. The constituent elements described below may include other constituent elements that may readily occur to those skilled in the relevant art, or constituent elements substantially identical to the described constituent elements. Further, the constituent elements described below may be used in combination as needed.

Lithium-Ion Secondary Battery

The lithium-ion secondary battery according to an embodiment of the present disclosure includes a sintered material including a positive electrode layer and a negative electrode layer that are alternately stacked via a solid electrolyte layer.

Structure of Lithium-Ion Secondary Battery

The FIGURE is a cross sectional view illustrating a conceptual structure of a lithium-ion secondary battery 10 according to an example of the present embodiment. In the lithium-ion secondary battery 10 illustrated in the FIGURE, a positive electrode layer 1 and a negative electrode layer 2 are stacked via a solid electrolyte layer 3. The positive electrode layer 1 includes a positive electrode active material layer 5 and a positive electrode current collector layer 4. The negative electrode layer 2 includes a negative electrode active material layer 7 and a negative electrode current collector layer 6. The solid electrolyte layer 3 includes a garnet-type Li-ion conductive oxide as a solid electrolyte.

Garnet-Type Li-Ion Conductive Oxide

A garnet-type Li-ion conductive oxide according to the present embodiment contains Li, La, Zr, and oxygen and contains at least one type of element among elements represented by M1, M2, M3, and M4. M1, M2, M3, and M4 are as follows:

M1: One or more types of elements selected from the group consisting of Mg, Ca, Sr, Ba, and Zn;
M2: One or more types of elements selected from the group consisting of Al, Ga, Co, Fe, and Y;
M3: One or more types of elements selected from the group consisting of Sn and Ge; and
M4: One or more types of elements selected from the group consisting of Ta and Nb.

A garnet-type Li-ion conductive oxide according to the present embodiment is represented by composition formula $Li_{x-2a-3b-4c-5d}M1_aM2_bM3_cM4_dLa_3Zr_2O_{12}$. M1, M2, M3, and M4 in the composition formula and ranges (relationship) of a, b, c, d, and x in the composition formula are as follows:

M1: One or more types of elements selected from the group consisting of Mg, Ca, Sr, Ba, and Zn;
M2: One or more types of elements selected from the group consisting of Al, Ga, Co, Fe, and Y;
M3: One or more types of elements selected from the group consisting of Sn and Ge;
M4: One or more types of elements selected from the group consisting of Ta and Nb;
$0 \leq a \leq 0.50$;
$0 \leq b \leq 0.33$;
$0 \leq c \leq 0.25$;
$0 \leq d \leq 0.20$;
$0 < 2a+3b+4c+5d \leq 1.0$; and
$6.0 \leq x \leq 8.0$.

In the garnet-type Li-ion conductive oxide according to the present embodiment, the Li site of $Li_7La_3Zr_2O_{12}$ is substituted with the above-described elements (M1, M2, M3, M4) in the substitution ranges (a, b, c, d, x). In this way, the garnet-type Li-ion conductive oxide according to the present embodiment can provide higher sintered density and ion conductivity than known $Li_7La_3Zr_2O_{12}$.

In the composition formula, M1 is one or more types of elements selected from the group consisting of Mg, Ca, Sr, Ba, and Zn, where the amount of substitution may be in a range of $0 \leq a \leq 0.50$. Substituting the Li site with an element according to M1 is considered to be equivalent to substituting two atoms of Li element occupying the Li site with one atom of another element. In this way, the effect can be obtained that lithium evaporation at the time of firing can be suppressed and high sintered density can be obtained. If the amount of substitution with M1 exceeds 0.5, compounds other than LLZ, such as $La_2Zr_2O_7$, may be produced, whereby reaction synthesis of LLZ may be hindered. As a result, it becomes difficult to obtain high sintered density. Further, M1 may be one or more types of elements selected from the group consisting of Ca, Sr, and Ba, where the range (the amount of substitution) may be $0 \leq a \leq 0.4$. In this way, ion conductivity of LLZ can be increased.

In the composition formula, M2 is one or more types of elements selected from the group consisting of Al, Ga, Co, Fe, and Y, where the amount of substitution may be in the range of $0 \leq b \leq 0.33$. Substituting the Li site with an element according to M2 is considered to be equivalent to substituting three atoms of Li element occupying the Li site with one atom of another element. In this way, the effect can be obtained that lithium evaporation can be suppressed at the time of firing and high sintered density can be obtained. However, if the amount of substitution with M2 exceeds 0.33, compounds other than LLZ, such as $La_2Zr_2O_7$, may be produced, whereby reaction synthesis of LLZ is hindered. As a result, it becomes difficult to obtain high sintered density. Further, M2 may be one or more types of elements selected from the group consisting of Al, Ga, and Y, where the range (the amount of substitution) may be $0 \leq b \leq 0.27$. In this way, ion conductivity of LLZ can be increased.

In the composition formula, M3 is one or more elements selected from the group consisting of Sn and Ge, where the amount of substitution may be in the range of $0 \leq c \leq 0.25$. Substituting the Li site with an element according to M3 is considered to be equivalent to substituting four atoms of Li element occupying the Li site with one atom of another element. In this way, the effect can be obtained that lithium evaporation can be suppressed at the time of firing and high sintered density can be obtained. However, if the amount of substitution with M3 exceeds 0.25, compounds other than LLZ, such as $La_2Zr_2O_7$, may be produced, whereby reaction synthesis of LLZ is hindered. As a result, it becomes difficult to obtain high sintered density. Further, M3 may be the element Ge, where the range (the amount of substitution) may be $0 \leq c \leq 0.20$. In this way, ion conductivity of LLZ can be increased.

In the composition formula, M4 is one or more types of elements selected from the group consisting of Ta and Nb, where the amount of substitution may be in the range of $0 \leq d \leq 0.20$. Substituting the Li site with an element according to M4 is considered to be equivalent to substituting five atoms of Li element occupying the Li site with one atom of another element. In this way, the effect can be obtained that lithium evaporation can be suppressed at the time of firing and high sintered density can be obtained. However, if the amount of substitution with M4 exceeds 0.20, compounds other than LLZ, such as $La_2Zr_2O_7$, may be produced, whereby reaction synthesis of LLZ is hindered. As a result, it becomes difficult to obtain high sintered density. Further, the amount of substitution with M4 may be in a range of $0 \leq d \leq 0.18$. In this way, ion conductivity of LLZ can be increased.

The relationship among M1, M2, M3, and M4 may be $0 < 2a + 3b + 4c + 5d \leq 1.0$. In this way, the effect can be obtained that lithium evaporation can be suppressed at the time of firing, and high sintered density and high ion conductivity can be obtained.

In the composition formula, x related to the composition amount of Li refers to a stable range of the amount of Li prior to substitution of Li site in the LLZ firing step. When in the range of $6.0 \leq x \leq 8.0$, LLZ can be stably fired. When x is in this range, the sintered material does not readily effloresce, and abnormal grain growth is also suppressed. In this way, high sintered density and high ion conductivity can be obtained.

As described above, in the garnet-type Li-ion conductive oxide represented by the composition formula $Li_{x-2a-3b-4c-5d}M1_aM2_bM3_cM4_dLa_3Zr_2O_{12}$, a defect at the Li site caused by a decrease in the composition amount of Li is compensated by M1, M2, M3, or M4 in a valence-balanced manner. In this way, M1, M2, M3, or M4 is selectively inserted to the defect at the Li site. Further, since the crystal phase of part of LLZ has a Li site defect even in the case of a stoichiometric composition, M1, M2, M3, or M4 can be inserted into the defect at the Li site.

In order to confirm whether the desired garnet-type Li-ion conductivity compound has been prepared, X-ray diffraction (XRD) is used. By fitting of a spectrum obtained by XRD with a known XRD spectrum of LLZ, it can be confirmed whether the obtained substance is LLZ. Further, by a Rietvelt analysis of the spectrum obtained by XRD, the lattice constant of the prepared garnet-type Li-ion conductivity compound can be estimated. Based on a change in the lattice constant, the presence or absence of substitution of the Li site with the element of M1, M2, M3, or M4 can be confirmed. Generally, if the ion radius of the substituting element is greater than the Li ion radius, the lattice constant is increased. If the ion radius of the substituting element is smaller than the Li ion radius, the lattice constant is decreased. Further, by identifying the contained elements by means of inductively coupled plasma optical emission spectroscopy (ICP-AES), it can be confirmed whether a garnet-type Li-ion conductivity compound of the desired composition has been prepared.

Method for Manufacturing Garnet-Type Li-Ion Conductive Oxide

An example of a method for manufacturing the garnet-type Li-ion conductive oxide according to the present embodiment will be described. The method for manufacturing the garnet-type Li-ion conductive oxide includes 1) a step of mixing raw material powder; 2) a calcination step, 3) a pulverization step, 4) a molding step, and 5) a firing step. Herein, a specific method for manufacturing LLZ will be described.

In the following, the steps will be described in order.

1) Step of Mixing Raw Material Powder

In this step, a plurality of kinds of raw material powder as raw materials are weighed and mixed so as to achieve the compounding ratio of the composition formula of the garnet-type Li-ion conductive oxide. Examples of the raw materials that may be used include carbonates, sulfates, nitrates, oxalates, chlorides, hydroxides, and oxides of the elements included in the composition formula.

Examples of the raw material that may be used for the element Li are $Li_2CO_3$, $LiNO_3$, $LiCOOH$, and $LiOH \cdot H_2O$. Examples of the raw material that may be used for the element La are $La_2O_3$, $La(OH)_3$ and $La(NO_3)_3 \cdot 6H_2O$. Examples of the raw material that may be used for the element Zr are $ZrO_2$ and $ZrO(NO_3)_2 \cdot 2H_2O$.

Elements M1, M2, M3, and M4 are elements with which Li is substituted.

Element M1 is one or more types of elements selected from the group consisting of Mg, Ca, Sr, Ba, and Zn. Element M1 is an element that has a valence of 2 when ionized. Examples of the raw material that may be used for element M1 include carbonates, sulfates, nitrates, oxalates, chlorides, hydroxides, ad oxides of element M1. Specific examples of the raw material for element M1 are MgO, $MgCO_3$, $Mg(OH)_2$, CaO, $CaCO_3$, SrO, $SrCO_3$, ZnO, and $ZnSO_4$.

Element M2 is one or more types of elements selected from the group consisting of Al, Ga, Co, Fe, and Y. Element M2 is an element that has a valence of 3 when ionized. Examples of the raw material that may be used for element M2 include carbonates, sulfates, nitrates, oxalates, chlorides, hydroxides, and oxides of element M2. Specific examples of the raw material for element M2 are $Al_2O_3$, $Al(OH)_3$, $Al(NO_3)_3 \cdot 9H_2O$, $Ga_2O_3$, $CO_2O_3$, $Fe_2O_3$, FeO, and $Y_2O_3$.

Element M3 is one or more types of elements selected from the group consisting of Sn and Ge. Element M3 is an element that has a valence of 4 when ionized. Examples of the raw material that may be used for element M3 include carbonates, sulfates, nitrates, oxalates, chlorides, hydroxides, and oxides of element M3. Specific examples of the raw material for element M3 are $SnO_2$ and $GeO_2$.

Element M4 is one or more types of elements selected from the group consisting of Ta and Nb. Element M4 is an element that has a valence of 5 when ionized. Examples of the raw material that may be used for element M4 include carbonates, sulfates, nitrates, oxalates, chlorides, hydroxides, and oxides of element M4. Specific examples of the raw material for element M4 are $Ta_2O_5$ and $Nb_2O_5$.

The raw materials may have finer grain size or a specific surface area of 10 $m^2/g$ or more. This does not apply, however, when the raw material is dissolved and mixed in a solvent. With regard to raw material that is subject to moisture absorption, transformation, or the like depending on, e.g., the preservation method, the raw material may be heated as needed, for example, so as to increase its purity.

The raw material may be mixed and pulverized by dry method without putting the material in solvent. The raw material may be put into solvent and mixed and pulverized by wet method. By the wet method whereby the raw material is put into solvent before mixing and pulverizing, enhanced mixing property can be obtained. The raw material may be mixed using a planetary mill, an attritor, a ball mill, or the like. As the solvent, a solvent that does not readily dissolve Li may be used. The solvent may include organic solvent such as ethanol. The mixing time may be 1 to 32 hours, depending on the mixed amount. When the raw material is pulverized by wet method, the pulverized raw material is dried at 70° C. to 110° C. to obtain a mixed powder.

2) Calcination Step

In the calcination step, the raw material mixed powder is thermally processed at a predetermined temperature (calcination temperature) not lower than a temperature at which reaction synthesis of LLZ occurs and not higher than a sintering temperature for sintering after molding. When $Li_2CO_3$ is included in inorganic material, for example, the predetermined temperature is not lower than a temperature at which the carbonate is decomposed. In this way, in the subsequent sintering step, density decrease due to the production of gas by thermal decomposition can be suppressed.

During LLZ calcination, the calcination temperature may be not lower than 800° C. and not higher than 1000° C. The calcination time may be such that LLZ synthesizing reaction can be sufficiently completed. The time may be empirically set in a range such that the amount of volatilization of volatile elements (such as lithium) can be suppressed. By performing this step, an LLZ powder as a base can be obtained.

3) Pulverization Step

In the pulverization step, the LLZ powder is pulverized to a predetermined grain size. The pulverization method may be a dry method whereby the LLZ powder is pulverized without being put into solvent, or a wet method whereby the LLZ powder is pulverized by being put into solvent. Preferably, the wet pulverization method is employed whereby the LLZ powder is put into solvent. In this pulverization method, a planetary mill, an attritor, a ball mill or the like may be used. As the solvent, a solvent that does not readily dissolve Li may be used. For example, an organic solvent such as ethanol or 2-propanol may be used. The time for which the LLZ powder and the solvent are mixed may be 1 to 16 hours, depending on the mixed amount. When the LLZ powder is pulverized by wet method, the pulverized LLZ powder is dried at 70° C. to 110° C. and then disintegrated to obtain an LLZ pulverized powder.

4) Molding Step

In the molding step, the LLZ pulverized powder is molded in a predetermined shape to fabricate a molding. The molding method includes, for example, preparing a granule by adding an organic binder to the separated and dried powder material, and molding the granule using a mold. Alternatively, the molding method may include preparing a slurry by adding an organic binder, dispersant and the like during the mixing, and molding the slurry into a sheet by doctor blade method. Further, as needed, a stacked body may be formed by stacking the obtained sheet molding and internal electrode members alternately in a plurality of layers.

5) Firing Step

In the sintering step, the molding fabricated as described above is sintered. At this time, the molding may be pressed as needed. The sintering temperature may be 1000° C. to 1300° C. The sintering atmosphere is not particularly limited and may be the atmosphere or a reducing atmosphere.

The present disclosure is not limited to the foregoing embodiment. It goes without saying that the technology according to the present disclosure may be implemented in various ways within the technical scope of the present disclosure.

All-Solid Type Lithium-Ion Secondary Battery

The materials of the all-solid type lithium-ion secondary battery 10 according to the present embodiment other than the solid electrolyte will be described.

Positive Electrode Active Material

The material for the positive electrode active material layer 5 is not particularly limited, and positive electrode active materials typically used in known all-solid batteries may be used. Specific examples of the positive electrode active material include manganese dioxide ($MnO_2$), iron oxide, copper oxide, nickel oxide, lithium-manganese composite oxide (such as $Li_xMn_2O_4$ and $Li_xMnO_2$), lithium-nickel composite oxide (such as $Li_xNiO_2$), lithium-cobalt composite oxide (such as $Li_xCoO_2$), lithium-nickel-cobalt composite oxide (such as $LiNi_{1-y}Co_yO_2$), lithium-manganese-cobalt composite oxide (such as $LiMn_yCo_{1-y}O_2$), spinel-type lithium-manganese-nickel composite oxide (such as $Li_xMn_{2-y}Ni_yO_4$), lithium phosphate compound having olivine structure (such as $Li_xFePO_4$, $Li_xFe_{1-y}Mn_yPO_4$, $Li_x$-

$CoPO_4$, and $LiVOPO_4$), lithium phosphate compound having the NASICON structure (such as $Li_xV_2(PO_4)_3$, $Li_2VOP_2O_7$, $Li_2VP_2O_7$, $Li_4(VO)(PO_4)_2$, and $Li_9V_3(P_2O_7)_3(PO_4)_2$), iron sulfate ($Fe_2(SO_4)_3$), and vanadium oxide (such as $V_2O_5$). Each of the examples may be used individually or two or more of the examples may be used in combination. In the above chemical formulas, x and y may be in the ranges of $1<x<5$ and $0<y<1$. Preferably, the positive electrode active material may be $LiCoO_2$, $LiNiO_2$, $Li_xV_2(PO_4)_3$, or $LiFePO_4$ among others.

Negative Electrode Active Material

The material of the negative electrode active material layer 7 is not particularly limited, and negative electrode active materials typically used in known all-solid batteries may be used. Specific examples of the negative electrode active material include carbon, metal lithium (Li), metal compound, metal oxide, Li metal compound, Li metal oxide (including lithium-transition metal composite oxide), boron-added carbon, graphite, and compound having the NASICON structure. Each of the above examples may be used individually, or two or more of the examples may be used in combination. For example, when metal lithium (Li) is used as the negative electrode active material, the capacity of the all-solid battery can be increased. The carbon may include typically known carbon material, such as graphite carbon, hard carbon, and soft carbon. Examples of the metal compound include LiAl, LiZn, $Li_3Bi$, $Li_3Sd$, $Li_4Si$, $Li_{4.4}Sn$, and $Li_{0.17}C(LiC_6)$. Examples of the metal oxide include SnO, $SnO_2$, GeO, $GeO_2$, $In_2O$, $In_2O_3$, $Ag_2O$, AgO, $Ag_2O_3$, $Sb_2O_3$, $Sb_2O_4$, $Sb_2O_5$, SiO, ZnO, CoO, NiO, $TiO_2$, and FeO. Examples of the Li metal compound include $Li_3FeN_2$, $Li_{2.6}Co_{0.4}N$, and $Li_{2.6}Cu_{0.4}N$. An example of the Li metal oxide (lithium-transition metal composite oxide) is a lithium-titanium composite oxide represented by $Li_4Ti_5O_{12}$. Examples of the boron-added carbon include boron-added carbon and boron-added graphite.

Current Collector

The material of the current collector (the positive electrode current collector layer 4 or the negative electrode current collector layer 6) of the all-solid type lithium-ion secondary battery 10 according to the present embodiment may be a material having large conductivity. Examples of the material are silver, palladium, gold, platinum, aluminum, copper, and nickel. Particularly, copper is preferable because it does not readily react with LLZ and, further, copper is effective in decreasing the internal resistance of the lithium-ion secondary battery. The materials of the positive electrode and the negative electrode included in the current collector may be the same or different from each other.

The positive electrode current collector layer 4 and the negative electrode current collector layer 6 of the lithium-ion secondary battery 10 according to the present embodiment may include a positive electrode active material and a negative electrode active material, respectively.

When the positive electrode current collector layer 4 and the negative electrode current collector layer 6 include a positive electrode active material and a negative electrode active material, respectively, adhesion is increased between the positive electrode current collector layer 4 and the positive electrode active material layer 5, and between the negative electrode current collector layer 6 and the negative electrode active material layer 7.

Method for Manufacturing Lithium Ion Secondary Battery

For manufacturing the lithium ion secondary battery 10 according to this embodiment, first, each material of the positive electrode current collector layer 4, the positive electrode active material layer 5, the solid electrolyte layer 3, the negative electrode active material layer 7, and the negative electrode current collector layer 6, which has been made into a paste, is prepared. Next, these materials are coated and dried, whereby green sheets are manufactured. The obtained green sheets are stacked to manufacture a stacked body, and by firing the stacked body at the same time, the lithium ion secondary battery 10 is manufactured.

A method of making the material into a paste is not limited in particular. For example, the paste can be obtained by mixing the powder of each material in vehicle. Here, the vehicle is a collective term for the medium in a liquid phase. The vehicle includes the solvent and the binder. By this method, the pastes for the positive electrode current collector layer 4, the positive electrode active material layer 5, the solid electrolyte layer 3, the negative electrode active material layer 7, and the negative electrode current collector layer 6 are prepared.

The prepared paste is coated on a base material such as PET in the desired order. Next, the paste on the base material is dried as necessary and then the base material is removed; thus, the green sheet is manufactured. The method of coating the paste is not particularly limited. Any of known methods including the screen printing, the coating, the transcription, and the doctor blade can be used.

A desired number of green sheets can be stacked in the desired order. If necessary, alignment, cutting and the like can be performed to manufacture a stacking block. In the case of manufacturing a parallel type or serial-parallel type battery, the alignment may be conducted when the green sheets are stacked, so that the end face of the positive electrode layer 1 does not coincide with the end face of the negative electrode layer 2.

In order to manufacture the stacked body, the active material unit to be described below may be prepared and the stacking block may be manufactured.

First, the paste for the solid electrolyte layer 3 is formed into a sheet shape on a PET film by the doctor blade method. After the paste for the positive electrode active material layer 5 is printed on the obtained sheet for the solid electrolyte layer 3 by the screen printing, the printed paste is dried. Next, the paste for the positive electrode current collector layer 4 is printed thereon by the screen printing, and then the printed paste is dried. Furthermore, the paste for the positive electrode active material layer 5 is printed again thereon by the screen printing, and the printed paste is dried. Next, by removing the PET film, the positive electrode active material layer unit is obtained. In this manner, the positive electrode active material layer unit in which the paste for the positive electrode active material layer 5, the paste for the positive electrode current collector layer 4, and the paste for the positive electrode active material layer 5 are formed in this order on the sheet for the solid electrolyte layer 3 is obtained. In the similar procedure, the negative electrode active material layer unit is also manufactured. The negative electrode active material layer unit in which the paste for the negative electrode active material layer 7, the paste for the negative electrode current collector layer 6, and the paste for the negative electrode active material layer 7 are formed in this order on the sheet for the solid electrolyte layer 3 is obtained.

One sheet of the positive electrode active material layer unit and one sheet of the negative electrode active material layer unit are stacked via the sheet for the solid electrolyte layer 3. At this time, the units may be staggered such that the paste for the positive electrode current collector layer 4 of the first sheet of the positive electrode active material layer unit extends only over one end face, with the paste for the negative electrode current collector layer 6 of the second sheet of the negative electrode active material layer unit extending only over the other end face. On both sides of the units thus stacked, sheets for the solid electrolyte layer 3 of a predetermined thickness are further stacked, fabricating a stacked block.

The manufactured stacking block is crimped at the same time. The crimping is performed while heat is applied. The heating temperature is, for example, 40° C. to 95° C.

The crimped stacking block is fired by being heated at 600° C. to 1200° C. under the nitrogen atmosphere. The firing time is, for example, 0.1 to 3 hours. Through this firing, the stacked body is completed.

In the following, specific synthesis examples of the garnet-type Li-ion conductive oxide according to the present embodiment in which the Li site is substituted with another element will be described.

EXAMPLES

The contents of the present embodiment will be described in more specific terms with reference to examples and a comparative example. It should be noted, however, that the present disclosure is not limited to the following examples.

In Examples 1 to 21, the raw materials corresponding to the respective elements were weighed and mixed so that M1, a, M2, b, M3, c, M4, and d of the composition formula $Li_{x-2a-3b-4c-5d}M1_aM2_bM3_cM4_dLa_3Zr_2O_{12}$ of the garnet-type Li-ion conductive oxide were as shown in Table 1. The raw materials used were $LiCO_3$, $La(OH)_3$, $ZrO_2$, $MgCO_3$, $CaCO_3$, $SrCO_3$, $BaCO_3$, $Al_2O_3$, $Ga_2O_3$, $Y_2O_3$, $GeO_2$, $Ta_2O_5$, and $Nb_2O_5$. Mixing was performed using ethanol solvent in a ball mill (120 rpm/zirconia balls) for 16 hours.

The resultant slurry was separated from the ethanol and zirconia balls, and then dried. In this way, a mixed powder was obtained.

The obtained mixed powder was put into a MgO container and calcined at 900° C. for 5 hours in the atmosphere, obtaining a LLZ powder.

The LLZ powder was pulverized in ethanol using a ball mill (120 rpm/zirconia balls) for 16 hours. The resultant slurry was separated from the balls and ethanol, and then dried. In this way, an LLZ pulverized powder was obtained.

To the LLZ pulverized powder, an organic binder was added to prepare a granule. The granule was molded in disc shape using a mold with diameter of 12 mm at 10 kN.

The LLZ powder was then placed on a magnesia setter and, with the fabricated molding placed on the powder, firing was performed at 1200° C. for 2 hours in the atmosphere. In this way, a disc-shaped sintered material sample was obtained.

The relative density and ion conductivity of the fabricated disc-shaped sintered material samples were measured. The measurement results are shown in Table 1.

The respective fabricated disc-shaped sintered material samples were pulverized in an agate mortar, and the pulverized material was subjected to inductively coupled plasma optical emission spectroscopy (ICP-AES). As a result, the compositions of the sintered material samples were similar to the composition of the compounding ratio mixed in the step of mixing the raw material powder. Namely, it is believed that Li hardly evaporated.

In the following, methods for measuring relative density and ion conductivity will be described.

Relative Density

The relative density of the Li-ion conductive oxide forming the disc-shaped sintered material was calculated as follows. First, the volume of the disc-shaped sintered material was measured using a caliper and a micrometer. Thereafter, the density of the disc-shaped sintered material was calculated by dividing the dry weight of the disc-shaped sintered material by the volume. The density was then divided by the theoretical density of LLZ cubic crystal (5.1 g/cm$^3$) to calculate the relative density.

Ion Conductivity

In a constant temperature bath, impedance and phase angle were measured using an AC impedance analyzer (SI1260 manufactured by Solartron) at a measurement temperature of 25° C., a measurement frequency of 5 mHz to 1 MHz, and an amplitude voltage of 50 mV. Based on the measurement values, a Nyquist plot was drawn, and the ion resistance value was determined based on its arc. By computing the inverse of the resistance value, the ion conductivity was calculated. The measurement by the AC impedance analyzer involved the use of an Au electrode as blocking electrode. The Au electrode was formed by sputtering on both sides of the disc-shaped sintered material in a circular shape with diameter of 6 mm.

A method for fabricating a comparative example will be described.

In Comparative Example 1, the raw materials corresponding to the respective elements were weighed and mixed so that a garnet-type Li-ion conductive oxide with the composition formula $Li_7La_3Zr_2O_{12}$ was obtained in which the Li site was not substituted with another element. As the raw materials, $LiCO_3$, $La(OH)_3$, and $ZrO_2$ were used. A disc-shaped sintered material was fabricated in the same way as in Examples 1 to 26 with the exception of the raw material compounding ratio, and the relative density and ion conductivity were measured. The measurement results are shown in Table 1.

TABLE 1

| | M1 | a | M2 | b | M3 | c | M4 | d | 2a + 3b + 4c + 5d | Li x | Relative density (%) | Ion conductivity (S/cm) |
|---|---|---|---|---|---|---|---|---|---|---|---|---|
| Comparative example 1 | — | 0.00 | — | 0.00 | — | 0.00 | — | 0.00 | 0.00 | 7.0 | 83.4 | 3.91 × 10−6 |
| Example 1 | Ca | 0.10 | — | 0.00 | — | 0.00 | — | 0.00 | 0.20 | 7.0 | 90.8 | 1.24 × 10−5 |
| Example 2 | Ca | 0.25 | — | 0.00 | — | 0.00 | — | 0.00 | 0.50 | 7.0 | 95.5 | 9.77 × 10−6 |
| Example 3 | Sr | 0.25 | — | 0.00 | — | 0.00 | — | 0.00 | 0.50 | 7.0 | 96.5 | 2.16 × 10−5 |
| Example 4 | Ba | 0.25 | — | 0.00 | — | 0.00 | — | 0.00 | 0.50 | 7.0 | 97.2 | 4.35 × 10−6 |
| Example 5 | Ca | 0.50 | — | 0.00 | — | 0.00 | — | 0.00 | 1.00 | 7.0 | 94.2 | 7.35 × 10−6 |
| Example 6 | — | 0.00 | Al | 0.05 | — | 0.00 | — | 0.00 | 0.15 | 7.0 | 93.3 | 3.45 × 10−4 |
| Example 7 | — | 0.00 | Al | 0.15 | — | 0.00 | — | 0.00 | 0.45 | 7.0 | 96.4 | 5.29 × 10−4 |

TABLE 1-continued

| | M1 | a | M2 | b | M3 | c | M4 | d | 2a + 3b + 4c + 5d | Li x | Relative density (%) | Ion conductivity (S/cm) |
|---|---|---|---|---|---|---|---|---|---|---|---|---|
| Example 8 | — | 0.00 | Ga | 0.15 | — | 0.00 | — | 0.00 | 0.45 | 7.0 | 95.7 | 6.72 × 10−6 |
| Example 9 | — | 0.00 | Y | 0.15 | — | 0.00 | — | 0.00 | 0.45 | 7.0 | 93.5 | 5.07 × 10−5 |
| Example 10 | — | 0.00 | Al | 0.33 | — | 0.00 | — | 0.00 | 0.99 | 7.0 | 92.3 | 1.59 × 10−4 |
| Example 11 | — | 0.00 | — | 0.00 | Ge | 0.15 | — | 0.00 | 0.60 | 7.0 | 90.8 | 7.11 × 10−6 |
| Example 12 | — | 0.00 | — | 0.00 | — | 0.00 | Ta | 0.05 | 0.25 | 7.0 | 91.3 | 1.01 × 10−4 |
| Example 13 | — | 0.00 | — | 0.00 | — | 0.00 | Ta | 0.10 | 0.50 | 7.0 | 91.9 | 1.20 × 10−4 |
| Example 14 | — | 0.00 | — | 0.00 | — | 0.00 | Nb | 0.10 | 0.50 | 7.0 | 92.0 | 3.09 × 10−4 |
| Example 15 | — | 0.00 | — | 0.00 | — | 0.00 | Ta | 0.15 | 0.75 | 7.0 | 93.8 | 1.98 × 10−4 |
| Example 16 | — | 0.00 | — | 0.00 | — | 0.00 | Ta | 0.20 | 1.00 | 7.0 | 90.1 | 9.67 × 10−5 |
| Example 17 | Sr | 0.10 | Al | 0.15 | — | 0.00 | — | 0.00 | 0.65 | 6.0 | 90.3 | 7.10 × 10−5 |
| Example 18 | Sr | 0.10 | Al | 0.15 | — | 0.00 | — | 0.00 | 0.65 | 6.8 | 91.0 | 7.66 × 10−5 |
| Example 19 | Sr | 0.10 | Al | 0.15 | — | 0.00 | — | 0.00 | 0.65 | 7.0 | 94.3 | 7.75 × 10−5 |
| Example 20 | Sr | 0.10 | Al | 0.15 | — | 0.00 | — | 0.00 | 0.65 | 7.2 | 95.1 | 8.35 × 10−5 |
| Example 21 | Sr | 0.10 | Al | 0.15 | — | 0.00 | — | 0.00 | 0.65 | 8.0 | 95.1 | 9.11 × 10−5 |

As shown in Table 1, in Examples 1 to 21, the Li site was substituted with other elements. In Examples 1 to 21, compared with Comparative Example 1 in which the Li site was not substituted with another element, ceramics sintered material having high relative density, or a practical relative density of 90% or more, was obtained.

It is also seen that by substituting the Li site with the element Ca, Sr, Ba, Al, Ga, Y, Ge, Ta, or Nb as in Examples 1 to 16, the ion conductivity of Examples 1 to 16 is increased from the ion conductivity ($3.91 \times 10^{-6}$ S/cm) of Comparative Example 1, in which the Li site was not substituted with another element.

Further, it is seen from the results of Examples 17 to 21 that LLZ can be stably fired when the amount of Li prior to substitution of Li site is within a range of $6.0 \leq x \leq 8.0$.

Specific synthesis examples of the garnet-type Li-ion conductive oxide according to the present embodiment in which the Li site is substituted with two or more other elements will be described.

In Examples 22 to 34, the raw materials were weighed and mixed so that the composition formula of the garnet-type Li-ion conductive oxide was as shown in Table 2. As in Examples 1 to 21, the raw materials used were $LiCO_3$, $La(OH)_3$, $ZrO_2$, $MgCO_3$, $SrCO_3$, $BaCO_3$, $Al_2O_3$, $Ga_2O_3$, $Fe_2O_3$, $Y_2O_3$, $GeO_2$, $SnO$, and $Nb_2O_5$. By the same method as in Examples 1 to 21, disc-shaped sintered material was fabricated and its relative density and ion conductivity were measured. The measurement results are shown in Table 2.

As shown in Table 2, it is seen that ceramics sintered material having relative density of 90% or more was obtained even when the Li site was substituted with two or more other elements.

Example 35

In the following, examples of the all-solid lithium secondary battery will be described. However, the present disclosure is not limited to the examples. In the following description, "parts" indicates "parts by mass" unless otherwise noted.

Preparation of Positive Electrode Active Material and Negative Electrode Active Material As the positive electrode active material and the negative electrode active material, $Li_3V_2(PO_4)_3$ prepared by the method below was used. First, $Li_2CO_3$, $V_2O_5$, and $NH_4H_2PO_4$ as the starting material were wet mixed for 16 hours using a ball mill. The powder obtained after dehydration and drying was calcined for two hours at 850° C. in a nitrogen-hydrogen mix gas. The calcined product was pulverized by wet method and then dehydrated and dried, whereby the positive electrode active material powder and the negative electrode active material powder were obtained. It has been confirmed that the prepared powder had a constituent of $Li_3V_2(PO_4)_3$ according to the X-ray diffraction apparatus.

TABLE 2

| | M1 | a | M2 | b | M3 | c | M4 | d | 2a + 3b + 4c + 5d | Li x | Relative density (%) | Ion conductivity (S/cm) |
|---|---|---|---|---|---|---|---|---|---|---|---|---|
| Example 22 | Sr | 0.10 | Al | 0.10 | — | 0.00 | — | 0.00 | 0.50 | 7.0 | 93.6 | 7.87 × 10−5 |
| Example 23 | Sr | 0.00 | Fe | 0.15 | — | 0.00 | — | 0.00 | 0.45 | 7.0 | 92.8 | 1.43 × 10−5 |
| Example 24 | Sr | 0.10 | — | 0.00 | Ge | 0.10 | — | 0.00 | 0.60 | 7.0 | 93.0 | 9.51 × 10−6 |
| Example 25 | Sr | 0.10 | — | 0.00 | Sn | 0.15 | — | 0.00 | 0.80 | 7.0 | 93.2 | 7.59 × 10−6 |
| Example 26 | Sr | 0.10 | — | 0.00 | — | 0.00 | Nb | 0.10 | 0.70 | 7.0 | 92.9 | 6.62 × 10−5 |
| Example 27 | — | 0.00 | Ga | 0.10 | Ge | 0.10 | — | 0.00 | 0.70 | 7.0 | 92.1 | 5.90 × 10−6 |
| Example 28 | — | 0.00 | Al | 0.10 | — | 0.00 | Nb | 0.10 | 0.80 | 7.0 | 92.2 | 1.13 × 10−4 |
| Example 29 | — | 0.00 | — | 0.00 | Ge | 0.10 | Nb | 0.05 | 0.65 | 7.0 | 92.1 | 1.21 × 10−5 |
| Example 30 | Sr | 0.10 | Al | 0.10 | Ge | 0.05 | — | 0.00 | 0.70 | 7.0 | 94.7 | 3.76 × 10−5 |
| Example 31 | Sr | 0.10 | Al | 0.10 | — | 0.00 | Nb | 0.10 | 1.00 | 7.0 | 91.7 | 8.33 × 10−6 |
| Example 32 | — | 0.00 | Al | 0.10 | Ge | 0.05 | Nb | 0.05 | 0.75 | 7.0 | 94.6 | 5.69 × 10−5 |
| Example 33 | Mg | 0.10 | Al | 0.15 | — | 0.00 | — | 0.00 | 0.65 | 7.0 | 90.6 | 3.54 × 10−5 |
| Example 34 | Sr / Ba | 0.20 / 0.20 | — | 0.00 | — | 0.00 | — | 0.00 | 0.80 | 7.0 | 92.0 | 6.52 × 10−6 |

Preparation of Paste for Positive Electrode Active Material Layer and Paste for Negative Electrode Active Material Layer The paste for the positive electrode active material layer and the paste for the negative electrode active material layer were prepared as below. In other words, 15 parts of ethyl cellulose as the binder and 65 parts of dihydroterpineol as the solvent were added to 100 parts of powder of $Li_3V_2(PO_4)_3$ to be mixed. Thus, the powder is dispersed in the solvent, whereby the paste for the positive electrode active material layer and the paste for the negative electrode active material layer were obtained.

Preparation of Solid Electrolyte

A solid electrolyte was prepared by the following method. The raw materials were respectively weighed and mixed so as to correspond to the composition formula $Li_{6.3}Sr_{0.2}Al_{0.3}Ge_{0.2}La_3Zr_2O_{12}$ of the garnet-type Li-ion conductive oxide. The raw materials used were $LiCO_3$, $La(OH)_3$, $ZrO_2$, $SrCO_3$, $Al_2O_3$, and $GeO_2$. Mixing was performed using ethanol solvent in a ball mill (120 rpm/zirconia balls) for 16 hours. The resultant slurry was separated from the ethanol and zirconia balls and then dried. In this way, a mixed powder was obtained. The mixed powder was put into a MgO container and calcined at 900° C. for 5 hours in the atmosphere, obtaining an LLZ calcined powder. The LLZ calcined powder was pulverized in ethanol using a ball mill (120 rpm/zirconia balls) for 16 hours. The resultant slurry was separated from the balls and ethanol and then dried. In this way, an LLZ pulverized powder was obtained. The composition of the prepared powder material was confirmed to be $Li_{6.3}Sr_{0.2}Al_{0.3}Ge_{0.2}La_3Zr_2O_{12}$ using an X-ray diffraction apparatus.

Next, this powder was wet mixed with 100 parts of ethanol and 200 parts of toluene as the solvent in the ball mill. After that, 16 parts of polyvinylbutyral binder and 4.8 parts of benzylbutylphthalate were further charged therein and mixed, whereby the paste for the solid electrolyte layer was prepared.

Manufacture of Sheet for Solid Electrolyte Layer

By molding a sheet with the paste for the solid electrolyte layer on a PET film as the base material by a doctor blade method, a sheet for a solid electrolyte layer with a thickness of 15 µm was obtained.

Preparation of Paste for Positive Electrode Current Collector Layer and Paste for Negative Electrode Current Collector Layer The powder of Ni and $Li_3V_2(PO_4)_3$ used as the positive electrode current collector and the negative electrode current collector was mixed at a volume ratio of 80/20. After that, ethyl cellulose as the binder and dihydroterpineol as the solvent were added and mixed, whereby the powder was dispersed in the solvent and thus the paste for the positive electrode current collector layer and the paste for the negative electrode current collector layer were obtained. The average particle diameter of Ni was 0.9 µm.

Preparation of Terminal Electrode Paste

By mixing silver powder, epoxy resin, and solvent, the powder was dispersed in the solvent and a thermosetting terminal electrode paste was obtained.

With the use of these pastes, the lithium ion secondary battery was manufactured as below.

Manufacture of Positive Electrode Active Material Layer Unit

The paste for the positive electrode active material layer with a thickness of 5 µm was printed on the sheet for the above described solid electrolyte layer by the screen printing. The printed paste was dried for 10 minutes at 80° C. Next, the paste for the positive electrode current collector layer with a thickness of 5 µm was printed thereon by the screen printing. The printed paste was dried for 10 minutes at 80° C. The paste for the positive electrode active material layer with a thickness of 5 µm was printed again thereon by the screen printing. The printed paste was dried for 10 minutes at 80° C. Next, the PET film was removed. Thus, the sheet of the positive electrode active material layer unit was obtained in which the paste for the positive electrode active material layer, the paste for the positive electrode current collector layer, and the paste for the positive electrode active material layer were printed and dried in this order on the sheet for the solid electrolyte layer.

Manufacture of Negative Electrode Active Material Layer Unit

The paste for the negative electrode active material layer with a thickness of 5 µm was printed on the sheet for the above described solid electrolyte layer by the screen printing. The printed paste was dried for 10 minutes at 80° C. Next, the paste for the negative electrode current collector layer with a thickness of 5 µm was printed thereon by the screen printing. The printed paste was dried for 10 minutes at 80° C. The paste for the negative electrode active material layer with a thickness of 5 µm was printed again thereon by the screen printing. The printed paste was dried for 10 minutes at 80° C. Next, the PET film was removed. Thus, the sheet of the negative electrode active material layer unit was obtained in which the paste for the negative electrode active material layer, the paste for the negative electrode current collector layer, and the paste for the negative electrode active material layer were printed and dried in this order on the sheet for the solid electrolyte layer.

Fabrication of Stacked Body

One sheet of the positive electrode active material layer unit and one sheet of the negative electrode active material layer unit were stacked via a solid electrolyte layer sheet. At this time, the units were staggered such that the paste for the positive electrode current collector layer of the first sheet of the positive electrode active material layer unit extended only over one end face, with the paste for the negative electrode current collector layer of the second sheet of the negative electrode active material layer unit extending only over the other end face. On both sides of the stacked units, solid electrolyte layer sheets were stacked to a thickness of 500 µm. Thereafter, the stack was molded by thermal press-bonding and cut into stacked blocks. The stacked blocks were then simultaneously fired, obtaining stacked bodies. The simultaneous firing was performed by increasing the temperature to a firing temperature of 1100° C. at a temperature increase rate of 200° C./h in nitrogen, and then maintaining the temperature for 2 hours. After the firing, the stacked bodies were naturally cooled.

Step of Forming Terminal Electrode

The terminal electrode paste was coated to the end face of the stacking block. The paste on the end face was thermally cured at 150° C. for 30 minutes, thereby forming a pair of terminal electrodes. Thus, the lithium ion secondary battery was completed.

Battery Evaluation

Leads were attached to the terminal electrodes of the obtained lithium-ion secondary battery, and a charging and discharging test was performed under the following measurement conditions. Specifically, the current at the time of both charging and discharging was 2.0 µA. The cut-off voltages at the time of charging and discharging were 4.0 V and 0 V, respectively. The battery charged and discharged well. With regard to the battery characteristics, in the secondary battery using the solid electrolyte of Comparative Example 1, the discharge capacity was 0.38 µA. On the other hand, the discharge capacity of the all-solid lithium secondary battery according to the example was 2.55 µA. Thus, it was learned that the all-solid lithium secondary batteries according to the example has very good battery characteristics.

As described above, by the manufacturing method according to the present embodiment, a garnet-type Li-ion conductive oxide having high sintered density can be easily prepared. The garnet-type Li-ion conductive oxide can be utilized for a solid electrolyte material in an all-solid secondary battery.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A garnet-type Li-ion conductive oxide comprising Li, La, Zr, and oxygen and containing at least one additional element selected from the group consisting of M1, M2, M3, and M4, wherein
M1, M2, M3, and M4 are as follows:
M1: One or more elements selected from the group consisting of Mg, Ca, Sr, Ba, and Zn;
M2: One or more elements selected from the group consisting of Co, Fe, and Y;
M3: One or more elements selected from the group consisting of Sn and Ge; and
M4: One or more elements selected from the group consisting of Ta and Nb,
wherein the at least one additional element substitutes for at least a portion of Li in the conductive oxide.

2. The garnet-type Li-ion conductive oxide according to claim 1, wherein
M1, M2, and M3 are as follows:
M1: One or more elements selected from Ca, Sr, and Ba;
M2: Y; and
M3: Ge.

3. An all-solid type lithium-ion secondary battery comprising
the garnet-type Li-ion conductive oxide according to claim 2.

4. An all-solid type lithium-ion secondary battery comprising
the garnet-type Li-ion conductive oxide according to claim 1.

5. The garnet-type Li-ion conductive oxide according to claim 1, wherein the additional elements are present from at least two of the M1, M2, M3, and M4 groups.

6. The garnet-type Li-ion conductive oxide according to claim 1, wherein the additional elements are present from at least three of the M1, M2, M3, and M4 groups.

7. The garnet-type Li-ion conductive oxide according to claim 1, wherein at least two of the additional elements are present from one of the M1, M2, M3, or M4 groups.

8. A garnet-type Li-ion conductive oxide represented by composition formula $Li_{x-2a-3b-4c-5d}M1_aM2_bM3_cM4_dLa_3Zr_2O_{12}$, wherein
M1, M2, M3, and M4 in the composition formula and ranges of a, b, c, d, and x in the composition formula are as follows:
M1: One or more elements selected from the group consisting of Mg, Ca, Sr, Ba, and Zn;
M2: One or more elements selected from the group consisting of Ga, Co, Fe, and Y;
M3: One or more elements selected from the group consisting of Sn and Ge;
M4: One or more elements selected from the group consisting of Ta and Nb;
$0 \leq a \leq 0.50$;
$0 \leq b \leq 0.33$;
$0 \leq c \leq 0.25$;
$0 \leq d \leq 0.20$;
$0 \leq 2a+3b+4c+5d \leq 1.0$; and
$6.0 \leq x \leq 8.0$.

9. The garnet-type Li-ion conductive oxide according to claim 8, wherein
M1, M2, and M3 are as follows:
M1: One or more elements selected from Ca, Sr, and Ba;
M2: One or more elements selected from the group consisting of Ga, and Y; and
M3: Ge.

10. An all-solid type lithium-ion secondary battery comprising
the garnet-type Li-ion conductive oxide according to claim 9.

11. The garnet-type Li-ion conductive oxide according to claim 9, wherein
$0 \leq a \leq 0.40$;
$0 \leq b \leq 0.27$;
$0 \leq c \leq 0.20$;
$0 \leq d \leq 0.18$.

12. An all-solid type lithium-ion secondary battery comprising
the garnet-type Li-ion conductive oxide according to claim 8.

13. The garnet-type Li-ion conductive oxide according to claim 8, wherein
$0 \leq a \leq 0.40$;
$0 \leq b \leq 0.27$;
$0 \leq c \leq 0.20$;
$0 \leq d \leq 0.18$.

14. A garnet-type Li-ion conductive oxide comprising
Li, La, Zr, Al and oxygen and containing at least one additional element selected from the group consisting of M1, M2, M3, and M4, wherein
M1, M2, M3, and M4 are as follows:
M1: One or more elements selected from the group consisting of Mg, Ca, Sr, Ba, and Zn;
M2: One or more elements selected from the group consisting of Ga, Co, Fe, and Y;
M3: One or more elements selected from the group consisting of Sn and Ge; and
M4: One or more elements selected from the group consisting of Ta and Nb,
wherein the at least one additional element substitutes for at least a portion of Li in the conductive oxide.

15. An all-solid type lithium-ion secondary battery comprising the garnet-type Li-ion conductive oxide according to claim 14.

16. A garnet-type Li-ion conductive oxide represented by composition formula $Li_{x-2a-3(b1+b2)-4c-5d}Al_{b1}M1_aM2_{b2}M3_cM4_dLa_3Zr_2O_{12}$, wherein M1, M2, M3, and M4 in the composition formula and ranges of a, b1, b2, c, d, and x in the composition formula are as follows:

M1: One or more elements selected from the group consisting of Mg, Ca, Sr, Ba, and Zn;

M2: One or more elements selected from the group consisting of Ga, Co, Fe, and Y;

M3: One or more elements selected from the group consisting of Sn and Ge;

M4: One or more elements selected from the group consisting of Ta and Nb;

$0 \leq a \leq 0.50$;

$0 < b1+b2 \leq 0.33$;

$0 \leq c \leq 0.25$;

$0 \leq d \leq 0.20$;

$a+b2+c+d>0$ $0<2a+3(b1+b2)+4c+5d \leq 1.0$; and $6.0 \leq x \leq 8.0$.

17. An all-solid type lithium-ion secondary battery comprising the garnet-type Li-ion conductive oxide according to claim 16.

\* \* \* \* \*